(12) United States Patent
Lu et al.

(10) Patent No.: US 7,559,471 B2
(45) Date of Patent: Jul. 14, 2009

(54) POSTAL STAMP TRACKING SYSTEM AND METHOD

(75) Inventors: Binh T. Lu, Endicott, NY (US); Thomas J. Otterlee, Brookfield, WI (US); Casimir F. Laska, Brookfield, WI (US)

(73) Assignee: Lockheed Martin Corporation, Bethesda, MD (US)

( * ) Notice: Subject to any disclaimer, the term of this patent is extended or adjusted under 35 U.S.C. 154(b) by 1073 days.

(21) Appl. No.: 10/725,047

(22) Filed: Dec. 1, 2003

(65) Prior Publication Data

US 2005/0116047 A1 Jun. 2, 2005

(51) Int. Cl.
*G06K 19/06* (2006.01)
(52) U.S. Cl. .................... 235/462.01; 235/492
(58) Field of Classification Search ............ 235/462.01, 235/492, 381; 705/401, 60
See application file for complete search history.

(56) References Cited

U.S. PATENT DOCUMENTS

| | | | |
|---|---|---|---|
| 3,995,741 A | 12/1976 | Henderson | |
| 4,008,792 A * | 2/1977 | Levasseur et al. | 194/217 |
| 5,347,114 A | 9/1994 | Tanaka | |
| 5,497,140 A * | 3/1996 | Tuttle | 340/10.1 |
| 5,667,249 A | 9/1997 | Critelli | |
| 5,774,053 A * | 6/1998 | Porter | 340/568.1 |
| 6,048,271 A * | 4/2000 | Barcelou | 463/48 |
| 6,203,069 B1 | 3/2001 | Outwater et al. | |
| 6,415,978 B1 | 7/2002 | McAllister | |
| 6,429,776 B1 | 8/2002 | Alicot et al. | |
| 6,467,684 B2 * | 10/2002 | Fite et al. | 235/379 |
| 6,484,933 B1 | 11/2002 | Zimmerman et al. | |
| 6,574,454 B1 | 6/2003 | Tuttle | |
| 6,701,304 B2 * | 3/2004 | Leon | 705/401 |
| 2002/0135481 A1 * | 9/2002 | Conwell et al. | 340/572.1 |

OTHER PUBLICATIONS

Savi Technology, Active and Passive RFID-Two Distinct But Complementary Technologies for Real-Time Supply Chain Visibility, Jan. 2002.
Lawrence S. Gould, What You Need to Know About RFID, Automotive Manufacturing & Production, Feb. 1, 2000, vol. 112, Issue 2, 2000 Bell & Howell Information and Learning Company, Gardner Publications, Inc. Feb. 2000.
Kevin J. Delaney, Telecommunications (A Special Report), Beyond Bar Codes: Radio ID tags may soon be placed in every product imaginable, The Wall Street Journal, Sep. 23, 2002, Dow Jones & Company, Inc.
Roy Want and Daniel M. Russell, Ubiquitous Electronic Tagging, Xerox PARC, Dec. 1999.
Dr. Jeremy Landt, Shrouds of Time- The History of RFID, an AIM Publication of Oct. 1, 2001, Pittsburgh, PA, USA.
The Association of the Automatic Identification and Data Capture Industry, Draft Paper of the Characteristics of RFID-Systems, Jul. 2000, AIM Inc.
The Association of the Automatic Identification and Data Capture Industry, Radio Frequency Identification RFID, A basic primer, AIM Inc. Aug. 23, 2001.

* cited by examiner

*Primary Examiner*—Daniel A Hess
(74) *Attorney, Agent, or Firm*—Michael Best & Friedrich LLP

(57) ABSTRACT

A trackable postage stamp includes a first surface and a second surface opposite the first surface. The second surface is adapted to adhere to a piece of mail. The stamp also includes a passive tracking device including stamp identification (ID) information.

3 Claims, 3 Drawing Sheets

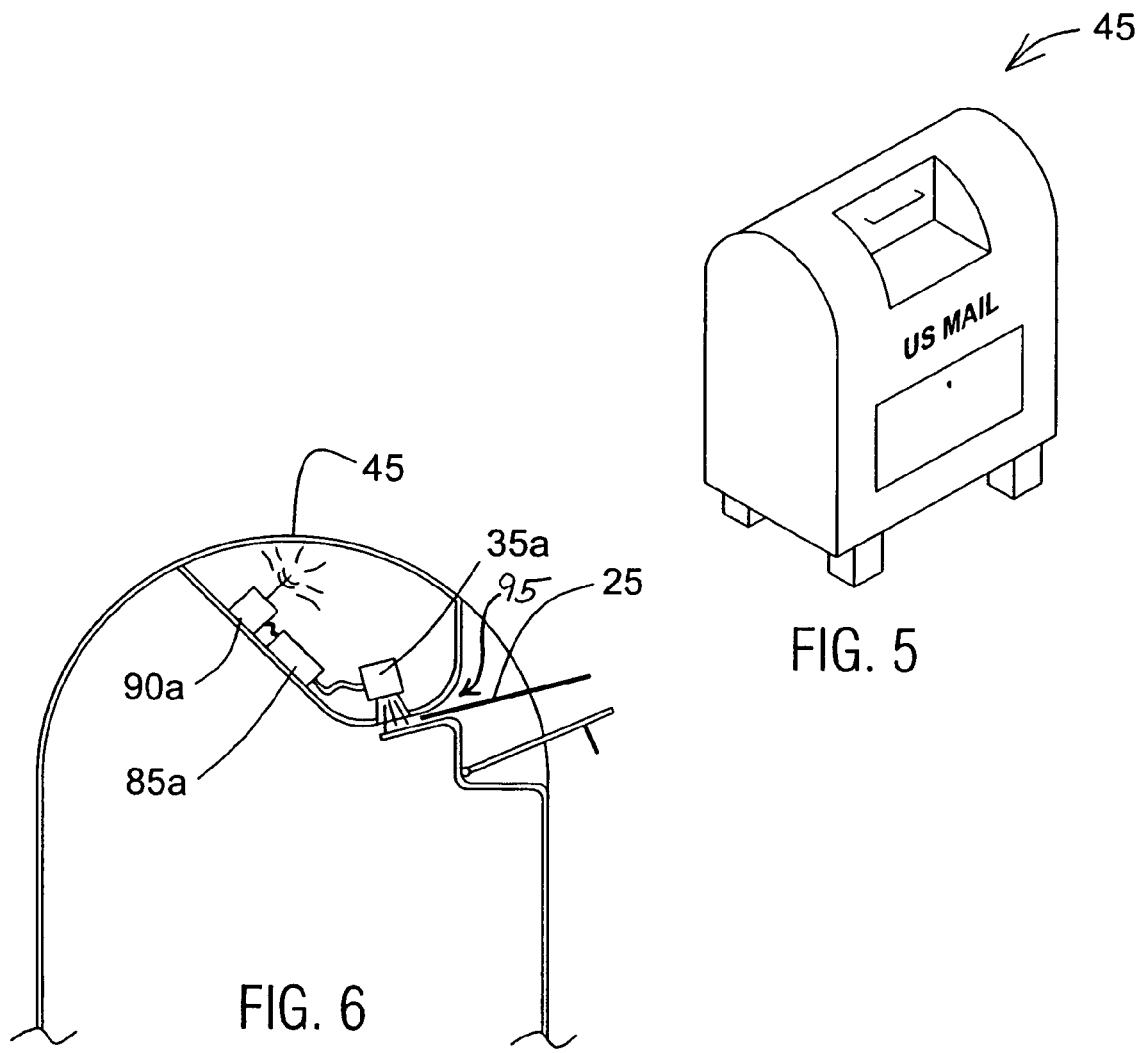
FIG. 5
FIG. 6
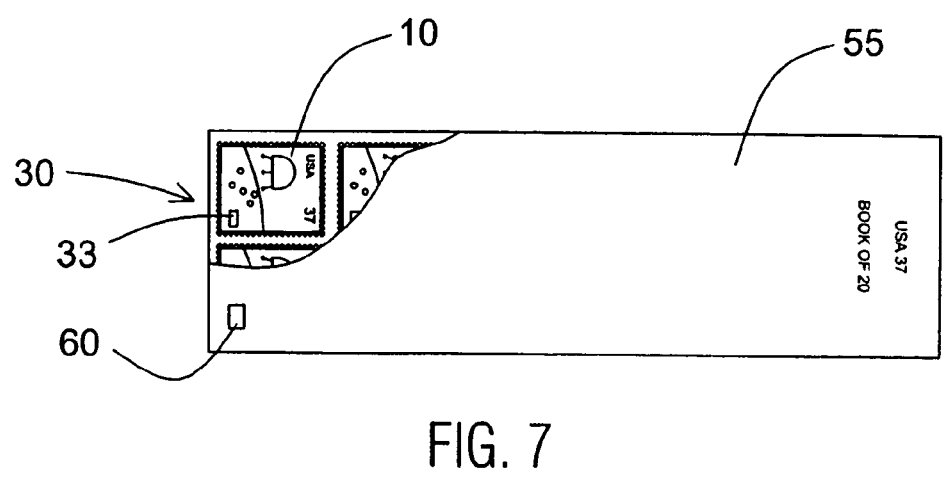
FIG. 7

POSTAL STAMP TRACKING SYSTEM AND METHOD

BACKGROUND

The present invention relates generally to postage stamps. More particularly, the present invention relates to a system and method for tracking individual postage stamps.

Postage stamps are commonly used to pay for the service of delivering a piece of mail from one location to another. The stamps are affixed to the piece of mail and the mail is dropped into a mailbox or other mail receptacle for delivery.

In recent years, a few individuals have taken advantage of the anonymity of the postal system to deliver dangerous packages or harmful substances. In one recent example, an individual mailed explosive devices to unsuspecting victims. Little evidence as to the source of the mail, much less the identity of the individual, was available. In another recent example, one or more persons mailed a harmful substance to unwitting individuals. In this case, the letters were available to investigators but little information could be gleaned other than where the stamp had been canceled.

SUMMARY

The present invention provides a trackable postage stamp comprising a first surface having information thereon and a second surface opposite the first surface. The second surface is adapted to adhere to a piece of mail. The stamp also includes a passive tracking device including stamp identification (ID) information.

In another aspect, the invention provides a stamp dispensing system comprising a plurality of stamps. Each stamp includes a tracking device that includes stamp ID information. A stamp dispenser is adapted to contain and dispense the stamps and a reader is operatively associated with the stamp dispenser to read the stamp ID information when the relative position between the stamp and the reader changes. A database is operable to store the read stamp ID information.

In still another aspect, the present invention provides a method of tracking the use of a stamp. The method includes the steps of coupling tracking information to the stamp, the tracking information including a stamp ID and dispensing the stamp to a customer. The method further includes reading the tracking information as the stamp is dispensed, and storing the stamp ID in a database.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 5 is a perspective view of a mailbox;

FIG. 6 is a partially broken away side view of the mailbox of FIG. 5 including a reader;

FIG. 7 is a front view of a book of stamps including a book identification device.

DETAILED DESCRIPTION

Figure 1:
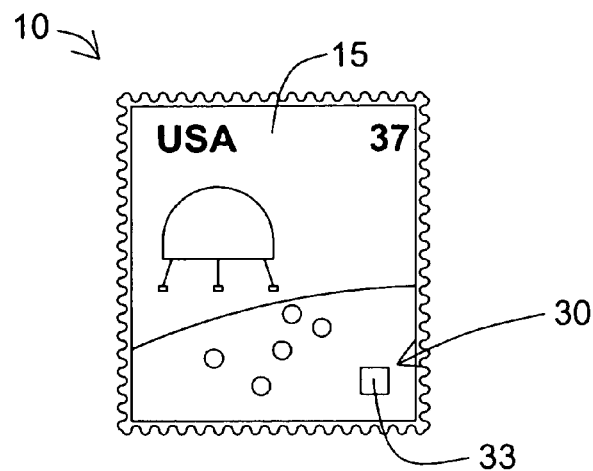
FIG. 1 is a front view of a postage stamp including a radio frequency identification (RFID) device.

With reference to FIG. 1, a typical postage stamp 10 is illustrated. The stamp 10 includes a first surface 15 having an image imprinted thereon. A second surface 20 (shown in FIG. 4) opposite the first surface 15 includes an adhesive that aids in the attachment of the stamp 10 to a piece of mail 25 such as a letter or a package. The stamp 10 also includes a tracking device 30 attached to the first surface 15 of the stamp 10. The tracking device 30 is illustrated as a small square in the lower right-hand corner of the stamp 10. While many tracking devices 30 are possible, a passive radio frequency identification (RFID) tag 33 is the preferred device.

RFID tags are generally classified into two broad groups, passive and active. Passive tags do not include a power supply of their own, while active RFID tags include a power supply such as a battery. Active RFID tags are typically able to be read from greater distances when compared to passive RFID tags. In addition, active tags can typically store and transmit more information than can passive RFID tags. However, active RFID tags are typically larger and more expensive then passive RFID tags. In addition, active RFID tags have a limited life span due to their need for an internal power supply.

RFID tags, whether passive or active, include an antenna and a transponder. The transponder may include memory (e.g., RAM, ROM, and/or non-volatile memory (EEPROM)) as well as analog or digital circuitry. The antenna provides for the communication link between a reader and the RFID tag.

While active tags derive their power from a battery or other energy storage device, passive tags receive power from the field generated by the reader. Passive tags generally rely on inductive coupling to transfer both power and data between the tag and the reader. For inductive coupling to function, the reader must produce a strong high-frequency field. The antennae of the reader and the tag, when in close proximity, establish a loosely connected "space transformer" which allows for the transfer of power to the RFID tag. The power operates the transponder circuitry, which transmits data to the reader if the RFID tag is properly queried.

Many frequency ranges can be used to operate passive RFID tags. However, three ranges have emerged in the industry, with each range having advantages and drawbacks. The low frequency range (approximately 100-500 kHz) allows for short to medium read ranges and is inexpensive to operate. However, the relatively slow reading speed inhibits the use of low frequency systems where many tags must be read quickly. The intermediate range (approximately 10-15 MHz) allows for short to medium read ranges, is potentially inexpensive, and provides for medium reading speed. The high range (approximately 850-950 MHz and 2.4-5.8 GHz) provides for long read range and a high reading speed (e.g., 2 megabits per second or faster). However, the high frequency RFID tags are expensive to manufacture and may require a line-of-sight to be read. As such, the medium frequency range or the low frequency range are preferable over the high frequency range.

In one construction, an RFID tag placed within the alternating magnetic field created by the reader draws energy from the magnetic field. This additional power consumption can be measured remotely as a voltage perturbation at the internal impedance of the reader antenna. The periodic switching on and off of a load resistance at the tag therefore causes voltage changes at the reader's antenna and thus has the effect of an amplitude modulation of the antenna voltage by the remote tag. If the switching on and off of the load resistor is controlled by the tag's stored data stream, then this data is transferred from the tag to the reader. This type of data transfer is called load modulation. The process of load modulation creates amplitude modulated sidebands symmetrically placed around the 13.56 MHz interrogation carrier frequency.

Because the coupling between reader antenna and tag is relatively weak and the voltage change created by the tag leads to relatively poor signal-to-noise ratios, reply code modulation with a subcarrier is utilized in most RFID chips. In this improved signalling method, the tag's data reply information is contained in a pair of backscattered sidebands which are subsequently demodulated in the RF and baseband signal processing sections of the reader to recover the tag's data stream. In ISO 15693 chips, for example, the subcarrier frequency is equal to 423.75 kHz (Fc/32) with either FSK or OOK modulation and Manchester data coding. The achievable label data transfer rate is up to a relatively fast 26.48 Kbps.

Passive RFID tags 33 are preferred for many reasons including their ability to be manufactured in large quantities and at sizes of less than ⅓ of a millimeter. In addition, passive RFID tags 33 can store 128 bits, 256 bits or more data as required. Furthermore, passive RFID tags 33 can be read from several feet away without a clear line of sight. This makes it possible to incorporate a reader 35 into a vending machine 40, mailbox 45, or other device that handles mail 25 or stamps 10.

Passive RFID tags 33 can be made small enough to be essentially hidden on the surface 15 or 20 of the stamp 10. Thus, while the tag 33 is represented as a small square on the surface 15 of the stamp 10, it should be understood that the tag 33 could be smaller than illustrated and would be difficult to see. In other constructions, the RFID tag 33 is attached to the second surface 20 of the stamp 10 to assure that it remains hidden from view or does not interfere with the image printed on the front 15 of the stamp 10.

Figure 2:
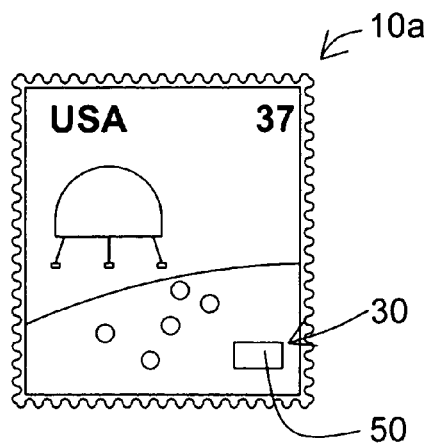
FIG. 2 is a front view of another stamp including a bar code identification device.

In another construction, illustrated in FIG. 2, the stamp 10a includes a tracking device 30 in the form of a bar code 50 (e.g., micro bar code) printed on the surface 15 of the stamp 10. The bar code 50 can be printed with the stamp image or during a separate printing step. In addition, the bar code can be hidden within the image on the stamp. Like the RFID tag 33, the bar code 50 is able to store data related to the stamp 10 and convey that data whenever the stamp 10 passes near a reading device. Unlike RFID, the bar code 50 requires a clear line of sight between the reader and the bar code 50 in order for the data to be read. The line of sight can be provided using mirrors or lenses if desired. However, an opaque object between the bar code and the reader can inhibit or prevent reading of the bar code.

In addition to single stamps 10, the present invention is well-suited to tracking stamps 10 sold in books 55 as illustrated in FIG. 7. The book 55 includes a book tracking device 60 such as an RFID tag or a bar code. The tracking device 60 includes information that clearly identifies the book 55. The tracking device 60 may also include data related to the individual stamps 10 contained within the book 55.

The tracking devices 30, 60 may include different information depending upon what type of product they are attached to. For example, when attached to the single stamp 10, the tracking device 30 may include stamp identification information 65 that includes one or more of a date of manufacture, a location of manufacture, a postage value, or an identification number. The numbers may be combined and encrypted to prevent tampering or reading by unauthorized individuals. In the example, a random number is combined with the other data and stored within the tracking device 30 as the stamp identification information 65 or stamp identification number. The stamp identification number 65 is unique to the stamp 10.

In the example, the stamp identification number 65 is also stored in a central database 70 along with the data that was used to make up the ID number 65. The data that makes up the stamp identification number 65 is parsed into its component parts such that the data can be used in the future if desired. It should be noted that the central database 70 need not be a single database located within a single computer or computer system. Rather, a network of several computers could be employed or several isolated computers could be used to house the data.

It should be clear to one of ordinary skill that many different forms of stamp identification numbers are possible. For example, all of the desired information could be combined mathematically into a single number that identifies the stamp 10. The combination could be such that the useable data could be extracted from the single ID number using a series of mathematical operations. In another construction, the stamp identification number consists of a series of numbers with each number representing a piece of data related to the stamp 10. In still another construction, no useful information is contained within the ID number assigned to the stamp 10. Instead, the information is recorded in the central database 70 and associated with the stamp identification number. The stamp identification number acts as a license plate that identifies the stamp and guides the user to the related stored data. Thus, each time the stamp identification number is read, the desired information is recorded in the central database 70 and associated with the correct stamp 10.

A book of stamps 55 may include a book identification number 75 that may include similar data to that of the stamp identification number 65. In addition, book data may include the stamp identification information 65 of each stamp 10 contained within the book 55. Again, the data could be mathematically combined into a single book identification number 75 if desired or could be represented by a series of numbers. In some constructions, each book 55 is given a book identification number 75 that does not represent any useful data but instead simply identifies the book 55. Useful data is recorded in the central database 70 and associated with the book identification number 75. For example, the date and place of manufacture could be recorded in the central database 70 and associated with the book identification number 75 on the date the book 55 is assembled. In addition, the stamp identification number 65 of each stamp 10 in the book 55 could be recorded in the database 70 and associated with the book identification number 75, thus enabling the tracking of each stamp 10 as it is used. Thus, the book identification number acts as a pointer to link the book to the desired stored data.

Figure 3:
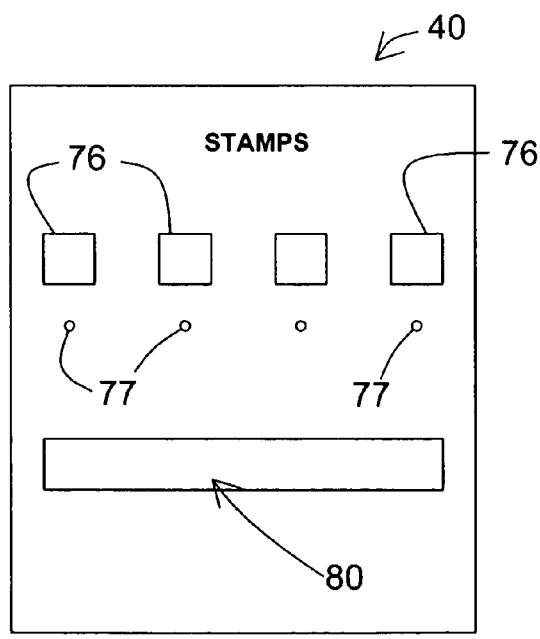
FIG. 3 is a front view of a stamp dispensing machine.
Figure 4:
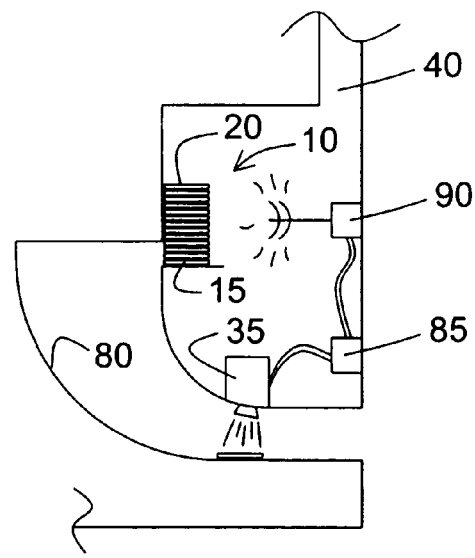
FIG. 4 is a partially broken away side view of the dispensing machine of FIG. 3 including a reader.

Turning to FIGS. 3 and 4, one vending machine 40 suited to dispense stamps 10 is illustrated. Stamps 10 are often dispensed from machines 40 of this type as single stamps 10, in books 55 (often containing twenty stamps or more), in sheets, or in rolls (often including 100 or more stamps). In addition, stamps 10 are dispensed in various denominations for use with different classes of mail 25 (e.g., post cards, letter size envelopes, full size envelopes, padded envelopes and the like). As such, the typical vending machine 40 includes several selections that are displayed in windows 76. To make a selection, a purchaser inserts money and depresses a button 77 located beneath the window 76 that displays the desired product. It should be noted that rolls and sheets are tracked by the invention in much the same manner as books 55. As such, rolls and sheets, as well as other forms in which multiple stamps 10 are sold together, should be considered books 55.

FIG. 4 illustrates a dispensing chute 80 of the vending machine 40 of FIG. 3. After the purchaser selects a product, the product is directed to the dispensing chute 80. The reader 35 disposed adjacent the dispensing chute 80 is able to read the tracking device 30, 60 attached to the product being dispensed. The reader 35 can be an RFID transponder that both queries and receives the data from an RFID tag 33, or a bar code reader that reads the bar code 50 as it passes. The product is then removed from the machine 40 by the purchaser and used as desired. The reader 35 can include a storage device such as a hard disk drive 85 that is able to store the data read from the product as it is dispensed. When the machine 40 is replenished, the data can be downloaded for storage in the central database 70. In another construction, the vending machine 40 includes a wired or wireless data transmitter 90 suited to transmitting the data periodically, or immediately after reading.

FIGS. 5 and 6 illustrate the typical mailbox 45 including a reader 35a. The mailbox 45 includes a mail slot 95 that is sized to receive the typical piece of mail 25. As the mail 25 is slid through the slot 95, the tracking device 30 is exposed to the reader 35a and read. In constructions that use RFID tags 33, a single reader 35a is able to read the tag 33 no matter the orientation of the envelope 25. In constructions that employ bar codes 50, two readers may be required, one on the top of the slot 95 and one on the bottom of the slot 95. The reader 35a, or readers, can include a storage device such as a hard disk drive 85a that is able to store the data read from the stamps 10. When the mail 25 is removed from the mailbox 45, the data can be downloaded for storage in the central database 70. In another construction, the mailbox 45 includes a wired or wireless data transmitter 90a suited to transmitting the data periodically, or immediately after reading.

Constructions that use RFID tags 33 are able to read multiple RFID tags 33 substantially simultaneously as they are deposited in the mailbox 45. Thus, inserting several envelopes 25 at once will likely not defeat the system. However, a system that employs bar codes 50 and a single reader may only be able to read the bar code 50 if a single envelope 25 is dropped into the mailbox 45. Simultaneously depositing multiple envelopes 25 into the mailbox 45 may cover one or more of the bar codes 50 and would inhibit system function. If an envelope is sensed but the RFID tag or bar code is not read, the sensor could activate an indicator that would inform the postal worker that mail in that mailbox should be carefully examined.

Figure 8:
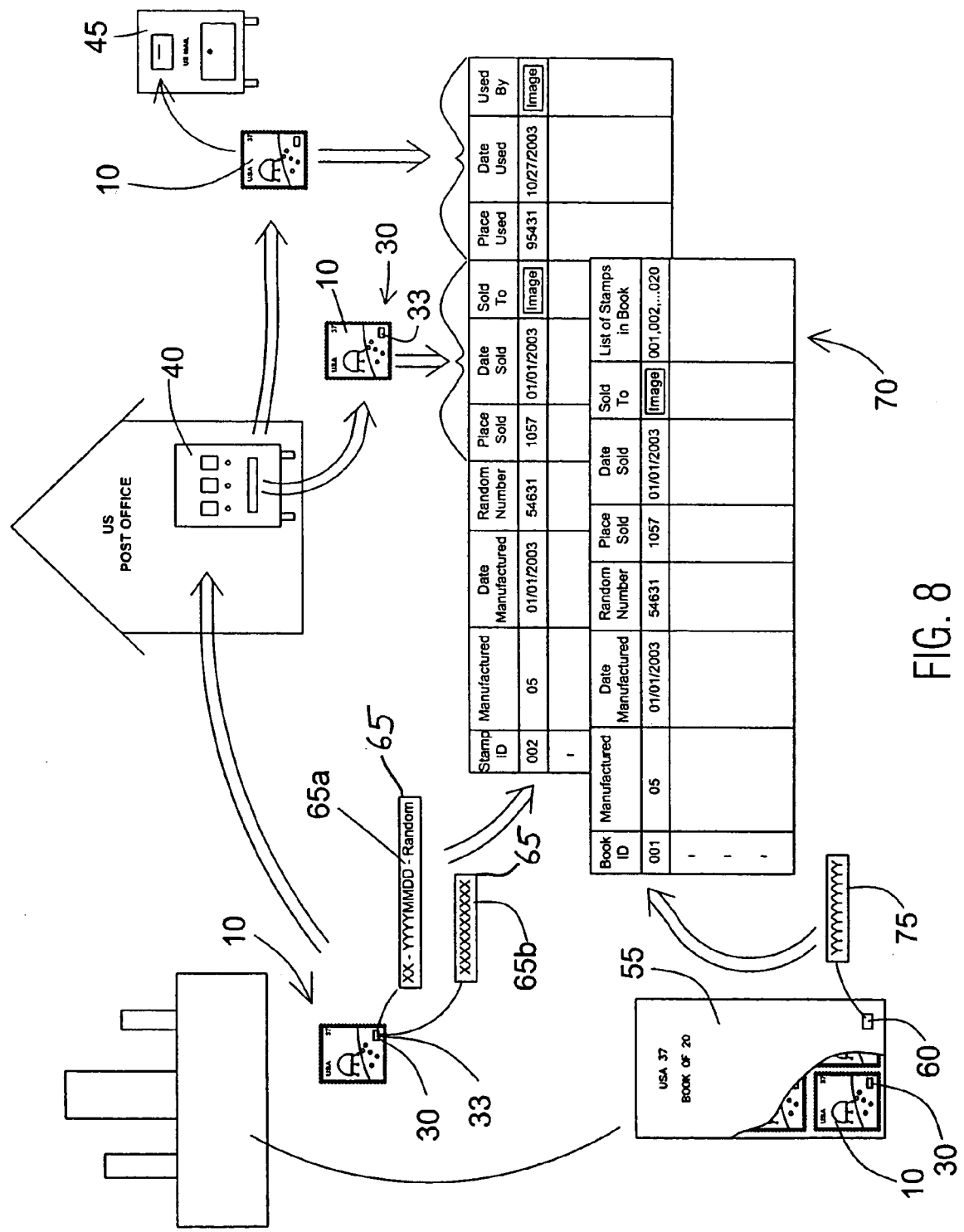
FIG. 8 is a flow chart illustrating the tracking of a single stamp.

The tracking devices 30, 60 work in conjunction with the central database 70 as illustrated in FIG. 8 to track stamps 10 as they move through the postal system. During or after the manufacture of the stamp 10, the tracking device 30 is attached to the stamp. The tracking device 30 includes, or is later programmed to include the stamp identification information 65. Data regarding the stamp identification number 65 as well as known data at the time of manufacturing is recorded in the central database 70. The data recorded in the central database 70 is parsed into usable segments such as the date and location of the manufacture of the stamp 10. In constructions that assign a single number or a series of numbers to each stamp 10, the assigned numbers are related to the desired data in the database 70, thereby making the data accessible when needed. FIG. 8 illustrates two possible stamp identification numbers 65a and 65b. The first, 65a includes useful data separated by hyphens, while the second 65b includes a number that conveys no information about the stamp 10 but rather serves to identify the stamp 10 so that useful information can be stored within, or retrieved from the central database 70. In the case of the second ID number 65b, the ID number 65b acts as a pointer in the database. The ID number 65b allows the user to recover the useful information by simply retrieving the data associated with the ID number 65b.

When the stamp 10 is dispensed, the stamp identification number 65 is read. The date and location of the sale is stored or transmitted to the database 70 for storage. In addition, a surveillance camera may be positioned to capture an image of the purchaser as the stamp 10 is being dispensed. This data can also be stored in the database 70 (e.g., in the "Sold To" column) and associated with the particular stamp 10 that was purchased.

When the stamp 10 is used, it is again scanned and data regarding the date and place the stamp 10 was placed in the postal system is recorded. The scanned data is stored within the database 70 for later analysis if necessary. Again, in many locations, it is also possible to capture an image of the mailer and store that image in the database 70 (e.g., in the "Used By" column).

The process just described is similar to the process that occurs when a book 55 of stamps is involved. Each book 55 includes a book identification number 75 that either directly conveys information or simply identifies the book 55 to allow for the storage and retrieval of book information in the central database 70. In addition, each stamp 10 within the book 55 includes a stamp tracking device 30 including stamp identification information 65.

When the book 55 is manufactured, the book identification number 75 along with book data is recorded in the central database 70. The book data is similar to the stamp data with the addition of a list of stamp identification numbers 65 identifying the stamps 10 contained within the book 55. By storing this data, it is possible to track the individual stamps 10 by first tracking the manufacture and sale of the book 55, followed by the use of the individual stamps 10.

Thus, when the book 55 is sold, the date and location of the sale, along with an image of the purchaser can be associated with the stamp identification number 65 for each stamp 10 in the book 55. When the stamps 10 are used, they are tracked and data is recorded in the same way as it is with individual stamps 10.

The data within the database 70 can be analyzed to look for patterns or particular individuals based on the stamps 10 that they use. For example, any stamp 10 that is deposited in the postal system more than a certain distance (e.g., seventy-five miles) from where it is purchased could be flagged as suspect, if this is deemed an unusual activity. In addition, where the postal service is used for questionable or improper activities and the stamp 10 used is available, information regarding the purchase location, deposit location, as well as an image of the purchaser and the user may be available to identify the purchaser or user.

In some constructions, stamps 10 that are not properly read are flagged as suspect. In some situations, an error with the reader 35 may cause the system to miss a stamp 10. Furthermore, it is possible for someone to tamper with the stamps 10 in an effort to defeat the system. To detect these situations, the mailbox 45 not only reads the tracking device 30 as the envelopes 25 are deposited in the mailbox 45, but also counts the number of envelopes 25. If the number of envelopes 25 does not match the number of tracking devices 30 read, the mailbox 45 is flagged and all of the stamps 10 are re-read until the unread stamps 10 are discovered. In another construction, the mailbox 45 reads the stamps 10 and provides a total count. The postal service employee or a machine then counts the number of stamps 10 to determine if any of the stamps 10 were not read. If one or more were not read, the stamps 10 are re-read until the unread stamp 10 or stamps 10 is discovered, or the mail itself is carefully examined. In this manner, undesirable tampering, or errors in the reading process can be detected and accounted for no matter what type of tracking device 30 is employed.

Thus, any tampering can be detected before a piece of mail 25 is delivered. As such, useful information can still be gleaned from the stamp 10, and suspicious mail can be individually examined.

Although the invention has been described in detail with reference to certain preferred embodiments, variations and modifications exist within the scope and spirit of the invention as described and defined in the following claims.

What is claimed is:

1. A method of tracking a postage stamp, the method comprising:
   coupling tracking information to the stamp, the tracking information including a stamp ID;
   dispensing the stamp to a customer;
   reading the tracking information as the stamp is dispensed;
   storing the stamp ID in a database; and
   further comprising reading the tracking information as the stamp is deposited into a postal mailbox, and storing the stamp ID and a mailbox location within a database, wherein the tracking information is stored within a passive RFID device.

2. The method of claim 1, further comprising comparing the mailbox location and the dispensing location, and identifying the stamp if the mailbox location is more than a predetermined distance from the dispensing location.

3. A method of tracking a postage stamp, the method comprising:
   coupling tracking information to the stamp, the tracking information including a stamp ID;
   dispensing the stamp of a customer;
   reading the tracking information as the stamp is dispensed;
   storing the stamp ID in a database;
   sensing when an article is deposited in a mailbox;
   determining when tracking information was not properly read for all the articles placed in the mailbox; and
   providing a perceivable indication when it has been determined that tracking information was not properly read for all the articles placed in the mailbox,
   wherein the tracking information is stored within a passive RFID device.

* * * * *